A. MADSON.
TENONING HEAD.
APPLICATION FILED NOV. 3, 1914.
1,130,913.
Patented Mar. 9, 1915.
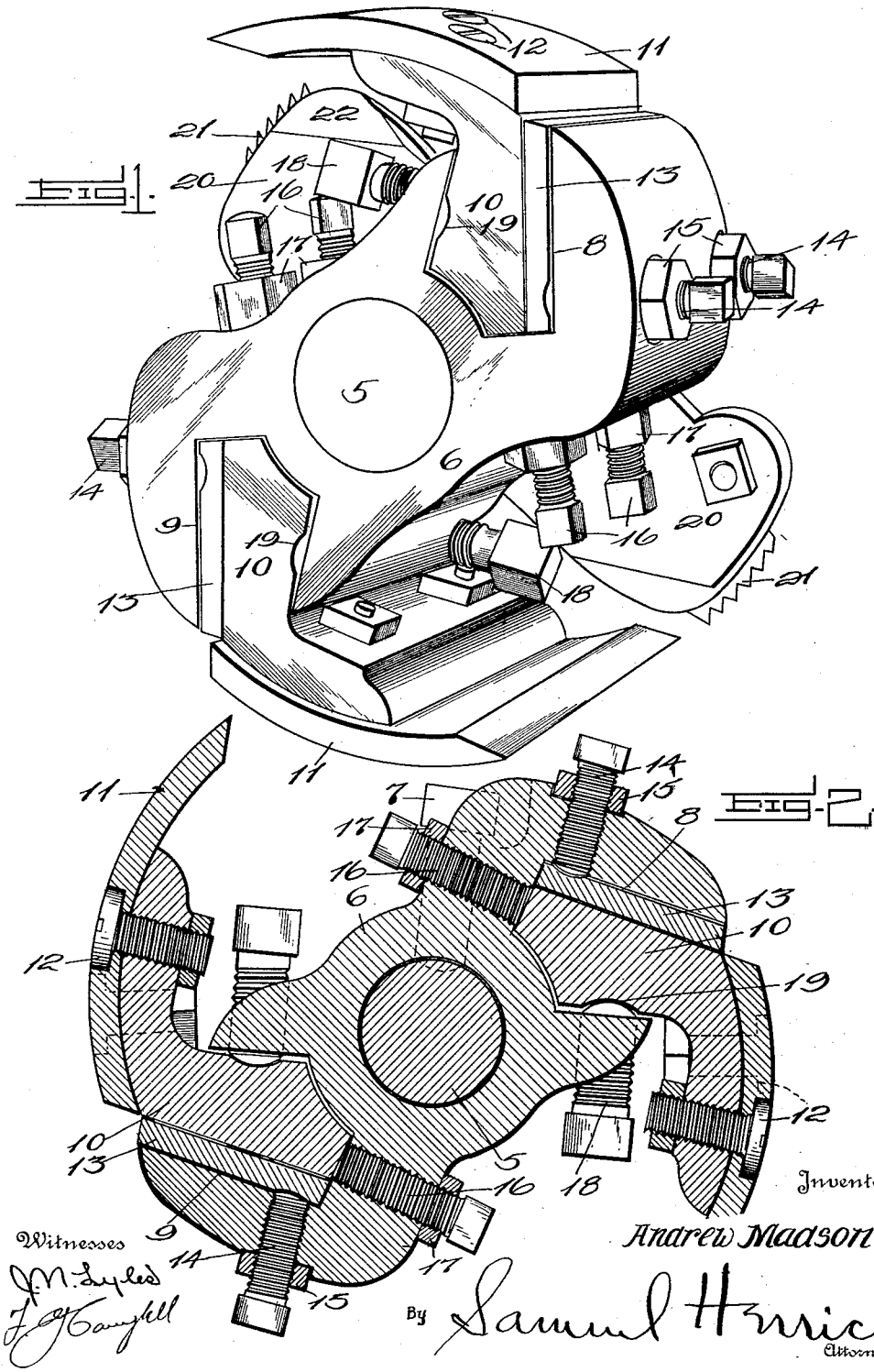

UNITED STATES PATENT OFFICE.

ANDREW MADSON, OF SALT LAKE CITY, UTAH.

TENONING-HEAD.

1,130,913.   Specification of Letters Patent.   Patented Mar. 9, 1915.

Application filed November 3, 1914. Serial No. 870,102.

*To all whom it may concern:*

Be it known that I, ANDREW MADSON, citizen of the United States, residing at Salt Lake City, in the county of Salt Lake and State of Utah, have invented certain new and useful Improvements in Tenoning-Heads, of which the following is a specification.

This device relates to tenoning heads or cutters and it has for its object the provision of an improved device of this character capable of quick and accurate adjustment of the cutting blades, and with the parts so arranged that after the cutters are once adjusted such adjustment is maintained even though the knives be removed for the purpose of grinding the same.

Further objects and advantages of the invention will be set forth in the detailed description which now follows.

In the accompanying drawing Figure 1 is a perspective view of a tenoning head constructed in accordance with the invention, and Fig. 2 is a sectional view thereof.

Like numerals designate corresponding parts in both of the figures of the drawing.

Referring to the drawing, 5 designates the mandrel or shaft upon which the head is to be mounted and with which the head rotates.

The body portion of the head is indicated at 6 and is bound to the mandrel 5 by a set screw 7. The head is recessed at 8 and 9 to form pockets or seats for blocks 10 to which cutting blades 11 are secured by counter sunk screws 12. Plates 13 lie between blocks 10 and one side of the recesses 8 and 9, and each of these plates is engaged by a pair of set screws 14, provided with lock-nuts 15. The inner end of each of the blocks 10 is engaged by a pair of set screws 16 provided with lock-nuts 17. The face of each of the blocks 10, remote from plate 13, is engaged by a set screw 18 which bears in an arcuate recess 19 of the block. A radial cutting bar 20 carrying cutters with teeth 21 held by bolt 24 and is provided with cutting edges 22.

The operation of devices of this character is well known to those skilled in the art. The invention resides particularly in the manner of mounting and adjusting the cutting blades 11. It is apparent that by screwing up upon one or the other of the set screws 16, the cutting edges of the blades may be brought into more or less parallelism with the axis of the mandrel. It is to be noted that there is a space between each of blocks 10 and one side of the recess in which the block is set, by virtue of which the block is permitted to have a limited rocking action in said recess. In other words, if screw 18 be retracted and screws 14 screwed up, blade 11 will be thrown to a position of greater eccentricity with relation to the mandrel, and consequently a deeper cut will be taken. Furthermore, when it is desired to grind the cutters, screws 14 and 16 maintain the former adjustment during the time that the blocks 10 with the blades 11 still attached, are removed from their seatings, and the blades ground. This may be accomplished by merely releasing screw 18 and sliding the blocks 10 axially of the mandrel from the recesses. It is sometimes the case, however, that more than one head is mounted upon a mandrel, and in that case it may not be possible to slide the blocks 10 axially of the mandrel. When this is the case, plates 13 may be first removed and after these plates are removed, the blocks may be removed from the recesses by a direct outward pull, despite the fact that they are larger at their inner ends than at their outer portions. In addition to properly alining the cutting edge of the blades with the mandrel, the screws 16 provide means for adjusting one of the cutters to cut to the same depth as the other cutter.

While the elements shown and described are well adapted to serve the purposes for which they are intended, it is to be understood that the invention is not limited to the precise construction set forth, but includes within its purview such changes as may be made within the scope of the appended claims.

Having described my invention what I claim is:

1. A tenoning device comprising a head recessed to form a plurality of seatings, a cutter carrying block seated in each of said recesses, adjusting pressure elements bearing upon the inner ends of said blocks, adjusting pressure elements bearing upon the outer faces of said blocks, and binding elements bearing upon the inner faces of said blocks.

2. A tenoning cutter comprising the body portion recessed to form a plurality of seatings, a blade carrying block in each of said seatings, a pair of adjusting screws threaded into the body and bearing against the inner ends of said blocks, a second pair of adjusting screws threaded through the head and arranged to exert pressure upon the outer faces of the blocks and a binding screw threaded through the head and arranged to exert pressure upon the inner faces of the block.

3. A tenoning cutter comprising the body portion recessed to form a plurality of seatings, a blade carrying block in each of said seatings, a pair of adjusting screws threaded into the body and bearing against the inner ends of said blocks, a second pair of adjusting screws threaded through the head and arranged to exert pressure upon the outer faces of the blocks and a binding screw threaded through the head and arranged to exert pressure upon the inner faces of the block, said blocks being of such size with relation to the recesses as to be capable of a slight rocking movement therein.

4. A tenoning cutter comprising the body portion recessed to form a plurality of seatings, a blade carrying block in each of said seatings, a pair of adjusting screws threaded into the body and bearing against the inner ends of said blocks, a second pair of adjusting screws threaded through the head and arranged to exert pressure upon the outer faces of the blocks and a binding screw threaded through the head and arranged to exert pressure upon the inner faces of the block, and filling plates disposed between the second named set of binding screws and each of said blocks.

In testimony whereof I affix my signature in the presence of two witnesses.

ANDREW MADSON.

Witnesses:
  E. C. ASHTON,
  GEO. W. PETERSEN.

Copies of this patent may be obtained for five cents each, by addressing the "Commissioner of Patents, Washington, D. C."